United States Patent
Blair et al.

(10) Patent No.: US 8,413,069 B2
(45) Date of Patent: Apr. 2, 2013

(54) METHOD AND APPARATUS FOR THE AUTOMATIC COMPLETION OF COMPOSITE CHARACTERS

(75) Inventors: Colin Blair, Westleigh (AU); Kevin Chan, Ryde (AU); Christopher R. Gentle, Gladesville (AU); Neil Hepworth, Artarmon (AU); Andrew W. Lang, Epping (AU)

(73) Assignee: Avaya Inc., Basking Ridge, NJ (US)

( * ) Notice: Subject to any disclaimer, the term of this patent is extended or adjusted under 35 U.S.C. 154(b) by 1743 days.

(21) Appl. No.: 11/170,676

(22) Filed: Jun. 28, 2005

(65) Prior Publication Data

US 2006/0294462 A1 Dec. 28, 2006

(51) Int. Cl.
*G06F 3/048* (2006.01)

(52) U.S. Cl. ........ 715/783; 715/773; 715/825; 715/259; 715/257; 345/168

(58) Field of Classification Search .................. 715/535, 715/783, 773, 825, 259, 257; 345/168
See application file for complete search history.

(56) References Cited

U.S. PATENT DOCUMENTS

| | | | | |
|---|---|---|---|---|
| 5,586,198 A | * | 12/1996 | Lakritz | 382/185 |
| 6,005,498 A | * | 12/1999 | Yang et al. | 341/23 |
| 6,007,339 A | * | 12/1999 | Zen et al. | 434/157 |
| 6,148,024 A | | 11/2000 | Ho et al. | |
| 6,674,372 B1 | * | 1/2004 | Ouyang | 341/28 |
| 6,686,907 B2 | * | 2/2004 | Su et al. | 345/171 |
| 6,801,659 B1 | | 10/2004 | O'Dell | |
| 6,970,599 B2 | * | 11/2005 | Longe et al. | 382/185 |
| 7,010,490 B2 | | 3/2006 | Brocious et al. | |
| RE39,326 E | * | 10/2006 | Comer et al. | 715/203 |
| 7,136,047 B2 | * | 11/2006 | Shimada et al. | 345/168 |
| 7,164,367 B2 | * | 1/2007 | Kushler et al. | 341/28 |
| 7,257,528 B1 | * | 8/2007 | Ritchie et al. | 704/7 |
| 7,424,156 B2 | | 9/2008 | Huang | |
| 7,437,287 B2 | | 10/2008 | Kim | |
| 8,032,357 B2 | * | 10/2011 | Kung et al. | 704/5 |
| 2002/0152075 A1 | | 10/2002 | Kung et al. | |

(Continued)

FOREIGN PATENT DOCUMENTS

| | | |
|---|---|---|
| CN | 1371042 | 9/2002 |
| JP | 2005-92856 | 4/2005 |

(Continued)

OTHER PUBLICATIONS

Josheph D backer; Typing Chinese, Japanese, and Korean; IEEE, 1985; 8 pages.*

(Continued)

*Primary Examiner* — Doon Chow
*Assistant Examiner* — Linh K Pham
(74) *Attorney, Agent, or Firm* — Sheridan Ross P.C.

(57) ABSTRACT

The automatic completion of composite characters is supported by the generation of lists of candidate words or characters. Such lists may be generated by specifying letters or word shapes that are required to be included in candidate words or characters, independent of the order in which a specified letter or word shape is traditionally added to the completed word or character. In a subtractive mode, a user may exclude words or characters that include one or more letters or word shapes specified by the user.

17 Claims, 5 Drawing Sheets

U.S. PATENT DOCUMENTS

| | | | |
|---|---|---|---|
| 2003/0023426 A1* | 1/2003 | Pun et al. | 704/9 |
| 2003/0054830 A1 | 3/2003 | Williams et al. | |
| 2003/0107555 A1 | 6/2003 | Williams | |
| 2003/0144830 A1 | 7/2003 | Williams | |
| 2003/0233615 A1* | 12/2003 | Morimoto et al. | 715/501.1 |
| 2004/0223644 A1 | 11/2004 | van Meurs | |
| 2004/0255248 A1* | 12/2004 | Chang | 715/533 |
| 2005/0065775 A1* | 3/2005 | Poon | 704/7 |
| 2005/0289481 A1* | 12/2005 | Chang et al. | 715/825 |
| 2006/0123338 A1* | 6/2006 | McCaffrey et al. | 715/531 |
| 2006/0293890 A1 | 12/2006 | Blair et al. | |
| 2007/0038452 A1 | 2/2007 | Blair et al. | |
| 2007/0050188 A1 | 3/2007 | Blair et al. | |
| 2007/0115146 A1* | 5/2007 | Jo | 341/22 |
| 2009/0164891 A1* | 6/2009 | Chang | 715/257 |

FOREIGN PATENT DOCUMENTS

| | | |
|---|---|---|
| TW | I226011 | 1/2005 |
| TW | 229844 | 3/2005 |
| WO | WO 2005/024779 | 3/2005 |

OTHER PUBLICATIONS

Yaxiong et al., Chinese Input-output table compilation and its Extension; 1985.*

Huang et al., Input and Output of Chinese and Japanese Characters; IEEE; 1985; 7 pages.*

Xu et al.; Generating New Styles of Chinese Stroke Based on Statistical Model; 2006; 8 pages.*

UIQ for Symbian OS v7.0 Demo 3: Entering an SMS with eZiText Chinese, ZI Corporation, 14 pp., printed May 25, 2005 from http://www.zicorp.com/eztextchinesehome.htm, 2005.

UIQ for Symbian OS v7.0 Demo 4: eZiText Chinese in the To Do application, 10 pp., printed May 25, 2005 from http://www.zicorp.com/eztextchinesehome.htm, 2005.

The Chinese Standard for text input, ZI Corporation, 3 pp, printed May 25, 2005 from http://www.zicorp.com/eztextchinesehome.htm, 2005.

Asian Language Terminology, Chinese Writing, 6 pp, printed May 26, 2005 from http://www.aproposinc.com/pages/asiantrm.htm, 1996.

Chinese input by shape, Wubizixing method, 2 pp, printed May 26, 2005 from http://www.honco.net/japanese/05/caption/caption-3-05.html, 2005.

Chinese characters, The history of Chinese characters, 8 pp, printed May 26, 2005 from http://www.blss.portsmouth.sch.uk/hsc/chinchars.shtml, 2005.

How to Read and Type Chinese Characters on Your Computer and Chinese Character Input Methods, 5 pp, printed May 26, 2005 from http://chinese-school.netfirms.com/Chinese-characters.html.

How to Write Chinese Characters, 3 pp, printed May 26, 2005 from http://www.csun.edu/~1151106/stroke.html, 2002.

eZiText Chinese; Introduction, 2 pp., printed Jun. 24, 2005 from http://www.zicorp.com/eztextchinesehome.htm, 2005.

eZiText Chinese, Demo 1, 10 pp., printed Jun. 24, 2005 from http://www.zicorp.com/eztextchinesehome.htm, 2005.

eZiText Chinese, Demo 2, 10 pp., printed Jun. 24, 2005 from http://www.zicorp.com/eztextchinesehome.htm, 2005.

eZiText Chinese, Demo 3, 13 pp., printed Jun. 24, 2005 from http://www.zicorp.com/eztextchinesehome.htm, 2005.

eZiText Chinese, Demo 4, 14 pp., printed Jun. 24, 2005 from http://www.zicorp.com/eztextchinesehome.htm, 2005.

Examiner's Office Letter for Japanese Patent Application No. 2006-177751, mailed Jan. 23, 2008, pp. 1-6.

First Office Action (including translation) for Chinese Patent Application No. 200610093577.7, dated Nov. 30, 2007, pp. 1-14.

Author unknown, Notice of Preliminary Rejection (including translation) for Korean Patent Application No. 2006-0058973, dated Jul. 27, 2007, pp. 1-4.

Second Office Action (including translation) for Chinese Patent Application No. 200610093577.7, dated May 23, 2008, pp. 1-5.

Translation of Official Action for Taiwan Patent Application No. 95114969, mailed Jul. 14, 2009.

* cited by examiner

METHOD AND APPARATUS FOR THE AUTOMATIC COMPLETION OF COMPOSITE CHARACTERS

FIELD OF THE INVENTION

The present invention is directed to the entry of composite characters. In particular, the present invention facilitates the entry of words or characters comprised of a number of letters or character shapes into communications or computing devices.

BACKGROUND

Mobile communication and computing devices that are capable of performing a wide variety of functions are now available. Increasingly, such functions require or can benefit from the entry of text. For example, text messaging services used in connection with cellular telephones are now in widespread use. As a further example, portable devices are increasingly used in connection with email applications. However, the space available on portable devices for keyboards is extremely limited. Therefore, the entry of text into such devices can be difficult. In addition, the symbols used by certain languages can be difficult to input, even in connection with larger desktop communication or computing devices.

In languages such as English, Roman characters (letters) are used to form words. More particularly, words in the English language are formed based on the individual letters that are included in the word and on the sequence of those letters. Accordingly, conventional autocompletion systems, for example that present a list of words to a user for selection, include in such a list only those words that include the specified letters in the specified order.

Chinese characters are an example of graphical symbols that are composed of a number of word shapes. The word shapes are in turn composed of a number of strokes. In order to properly compose a Chinese character, each of the strokes of an included word shape must be written in a particular order. In addition, each of the word shapes must be entered in a particular order.

Chinese characters (and characters in other languages that use complex written symbols) can be very laborious to enter into communications and computer devices. For example, a typical Chinese character is comprised of about nine strokes. In addition, distinguishing between different Chinese characters can be difficult, even for highly literate Chinese speakers and writers. For example, modern Chinese writing uses about 6,000 of the over 50,000 Chinese characters that have been cataloged. Even reading a typical newspaper can require knowledge of about 4,000 Chinese characters. In addition to the many subtle variations that often distinguish characters, there is a predefined order in which the strokes comprising different word shapes, and the different word shapes comprising different characters, are to be written. This traditional ordering has carried over into the user inputs of communications and computer devices. As a result, even a user who may be able to recognize a desired character if presented with that character may be unable to use an automated list to retrieve that character if the user cannot recall the first stroke or shape used to compose the desired character. Therefore, automated lists that may be available to facilitate the entry of Chinese characters will not contain the desired character if the first stroke or word shape entered by the user is not the first stroke or word shape that is traditionally written in forming that character.

In order to permit a user to enter Chinese characters using a communications or computing device, keyboards may be provided with individual keys that correspond to the basic strokes used to compose Chinese characters. However, because a single Chinese character can be composed of a large number of individual strokes, such methods can be extremely time consuming. In addition, such systems have adhered to the requirement that the strokes be entered in their proper order. Therefore, it can be extremely difficult for even a native Chinese speaker to successfully enter a Chinese character through the selection of individual strokes because the user must not only remember every stroke that is included in the character the user is attempting to write, but also the order in which the strokes should be entered.

As an alternative, keyboards that allow a user to select word shapes have been developed. Such systems can reduce the number of individual keystrokes that a user must enter in order to complete a character. However, such systems have continued to require that the user enter the word shapes in the correct order.

The entry of complex characters can be simplified by providing an autocompletion function. According to such systems, once a user has begun to input a series of strokes or word shapes, a number of characters containing the entered strokes or word shapes may be presented to the user, for example in the display screen of the user's device. Furthermore, the candidate characters may be ordered such that the more commonly used characters appear higher up in the list of displayed characters. However, because the correct ordering of stroke or word shape entry is required, the user may be unable to cause a list containing the desired character to be generated. As a result, a user may be unable to select or input the desired character, even though the user would be able to recognize that character if it was presented to them.

SUMMARY

In accordance with embodiments of the present invention, a method and apparatus is provided according to which words or complex characters can be entered into a communications or computing device without requiring that the components of such words or characters be entered in a predefined order. More particularly, the entry of a number of component parts of a word or character results in the generation of a list of candidate words or characters containing those components, regardless of the order in which such components should be entered, as defined by the rules for writing the characters conventionally. Therefore, embodiments of the present invention can allow a user to recognize and select a complex character presented as part of a list of candidate words or characters, even if the user has entered the individual components in an order that is improper, at least with respect to the selected word or character.

In accordance with other embodiments of the present invention, a method and apparatus is provided that permits a user to narrow a list of candidate word or characters by subtracting a selected letter, stroke or word shape. For example, a user may cause a relatively large list of candidate words or characters to be generated and displayed by entering at least some of the letters, strokes or word shapes included in a desired word or character. The user may then narrow that list by making an entry indicating that a particular letter, stroke or word shape is not part of the desired word or character.

Additional features and advantages of the present invention will become more readily apparent from the following discussion, particularly when taken together with the accompanying drawings.

DETAILED DESCRIPTION

In accordance with embodiments of the present invention, a word or character may be included in a list of words or characters available for selection by a user in response to user input indicating that a particular component of a word or character, such as a letter (for example in the case of an English word) or a stroke or word shape (for example in the case of a Chinese character), is included in the desired word or character. Furthermore, embodiments of the present invention generate the list without regard to the position of the selected component in a sequence of components comprising a word or character. In accordance with still other embodiments of the present invention, a set of words or characters available for selection may be narrowed by subtracting those words or characters that include a selected component. Accordingly, embodiments of the present invention facilitate the entry of words or characters using communication or computing devices by allowing a user to select a desired word or character from a list generated in response to components of the desired word or character entered by the user in an addition mode, independent of the order in which those components were entered (or components not desired by the user in a subtracting mode).

Figure 1:
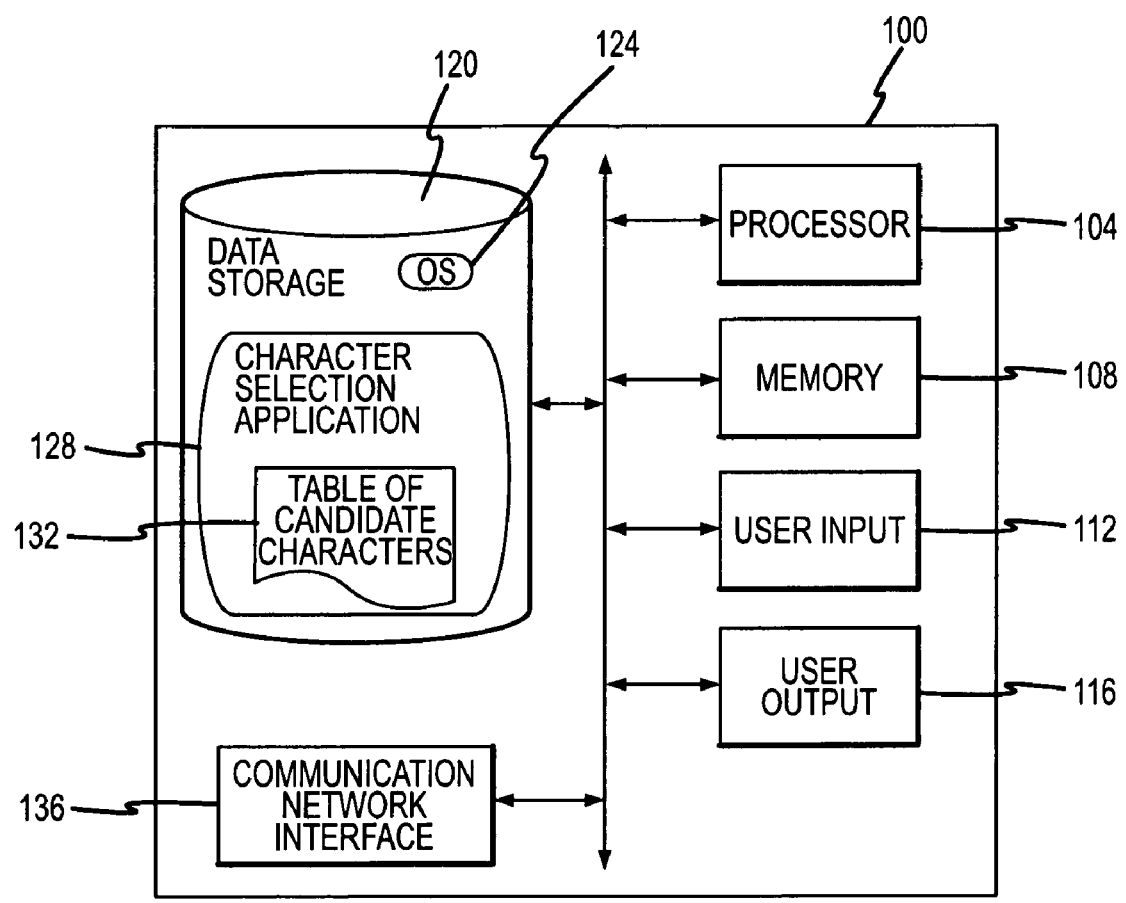
FIG. 1 is a block diagram of components of a communication or computing device in accordance with embodiments of the present invention.

With reference now to FIG. 1, components of a communications or computing device 100 in accordance with embodiments of the present invention are depicted in block diagram form. The components may include a processor 104 capable of executing program instructions. Accordingly, the processor 104 may include any general purpose programmable processor or controller for executing application programming. Alternatively, the processor 104 may comprise a specially configured application specific integrated circuit (ASIC). The processor 104 generally functions to run programming code implementing various functions performed by the communication or computing device 100, including word or character selection operations as described herein.

A communication or computing device 100 may additionally include memory 108 for use in connection with the execution of programming by the processor 104 and for the temporary or long term storage of data or program instructions. The memory 108 may comprise solid state memory resident, removable or remote in nature, such as DRAM and SDRAM. Where the processor 104 comprises a controller, the memory 108 may be integral to the processor 104.

In addition, the communication or computing device 100 may include one or more user inputs 112 and one or more user outputs 116. Examples of user inputs 112 include keyboards, keypads, touch screen inputs, and microphones. Examples of user outputs 116 include speakers, display screens (including touch screen displays) and indicator lights. Furthermore, it can be appreciated by one of skill in the art that the user input 112 may be combined or operated in conjunction with a user output 116. An example of such an integrated user input 112 and user output 116 is a touch screen display that can both present visual information to a user and receive input selections from a user.

A communication or computing device 100 may also include data storage 120 for the storage of application programming and/or data. In addition, operating system software 124 may be stored in the data storage 120. The data storage 120 may comprise a magnetic storage device, a solid state storage device, an optical storage device, a logic circuit, or any combination of such devices. It should further be appreciated that the programs and data that may be maintained in the data storage 120 can comprise software, firmware or hardware logic, depending on the particular implementation of the data storage 120.

Figure 2:
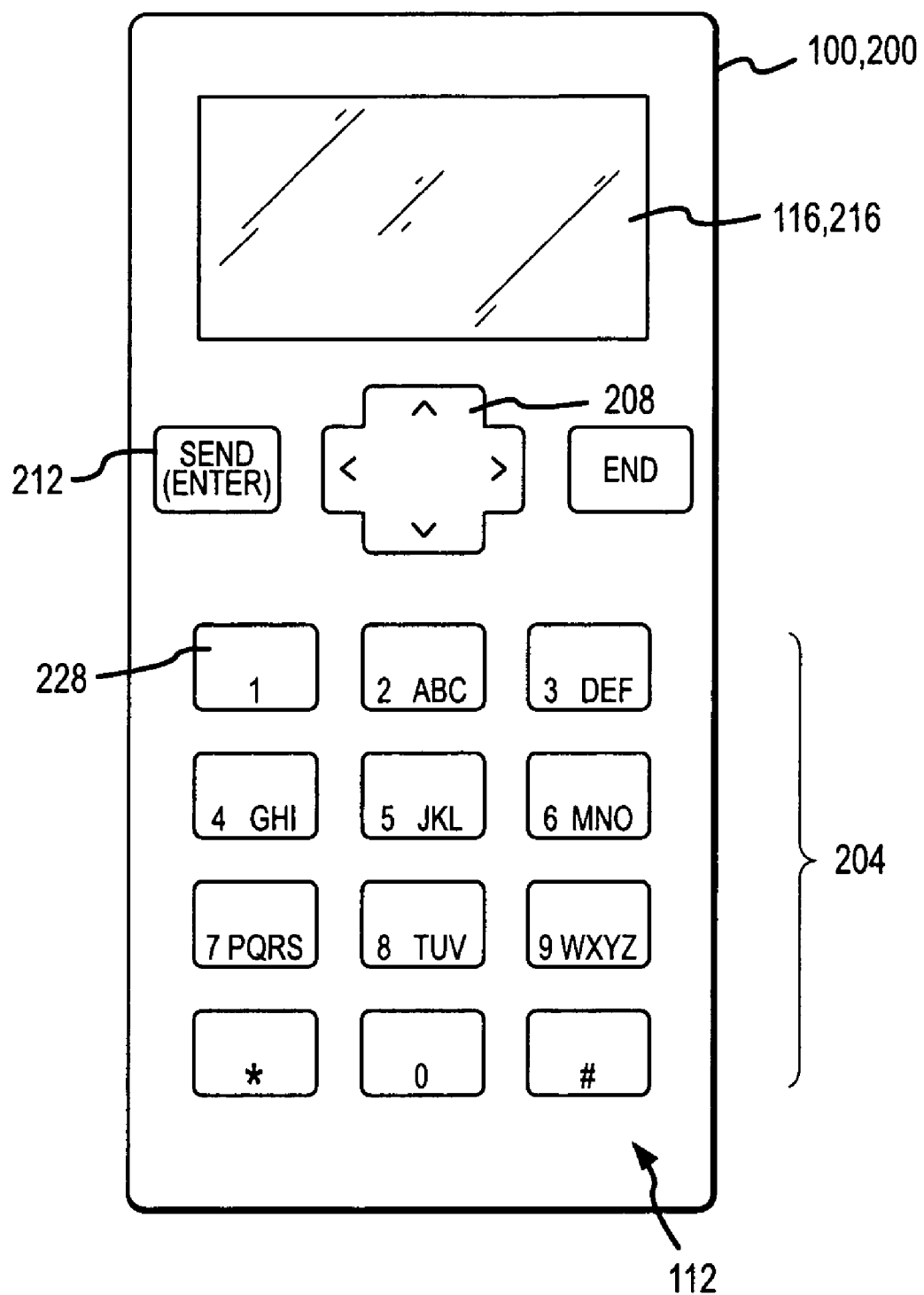
FIG. 2 depicts a communication device in accordance with embodiments of the present invention.

Examples of applications that may be stored in the data storage 120 include character selection application software 128. Character selection application software 128 may comprise instructions for implementing a word or character autocompletion process as described herein. In addition, the data storage 120 may contain a table of candidate words or characters 132. The table of candidate words or characters 132 may comprise a hash table associating letters or word shapes with words or characters containing a particular letter or word shape. Furthermore, as depicted in FIG. 2, the table of candidate words or characters 132 may be incorporated in or may be integral to a character selection application 128. Alternatively, the table of candidate characters 132 may be maintained separately in data storage 120 (or in a different data storage device), for example as part of a database. The data storage 120 may also contain application programming and data used in connection with the performance of other functions of the communication or computing device 100. For example, in connection with a communication or computing device 100 such as a cellular telephone, the data storage 120 may include communication application software. As another example, a communication or computing device 100 such as a personal digital assistant or a general purpose computer may include a word processing application in data storage 120. Furthermore, according to embodiments of the present invention, a word or character selection application 128 may operate in cooperation with communication application software, word processing software or other applications that can receive words or characters entered by a user as input.

A communication or computing device 100 may also include one or more communication network interfaces 136. Examples of communication network interfaces include cellular telephony transceivers, a network interface card, a modem, a wireline telephony port, a serial or parallel data port, or other wireline or wireless communication network interface.

With reference now to FIG. 2, a communication or computing device 100 comprising a cellular telephone 200 is depicted. The cellular telephone 200 generally includes a user input 112 comprising a numeric keypad 204, cursor control button 208 and enter button 212. In addition, the cellular telephone 200 includes a user output 116 comprising a visual display 216, such as a color or monochrome liquid crystal display (LCD). When in a text entry mode, a user can, in accordance with embodiments of the present invention, cause partial or complete lists containing one or more words or characters to be displayed in the display screen 216, in response to input comprising specified letters or word shapes entered by the user through the keypad 204. As can be appreciated by one of skill in the art, each key included in the keypad 204 may be associated with a number of letters or character shapes, as well as with other symbols. For instance, the keypad 204 in the example of FIG. 2 associates three (and sometimes four) letters with keys 2-9. Accordingly, a user may select one of the letters associated with a particular key by pressing or tapping the key associated with a desired letter or word shape multiple times.

The keypad 204 can also include keys that are associated with one or more word shapes, for use in connection with the entry of, for example, written text that is not formed using Roman characters or letters. For example, for entering Chinese characters, each key in the keypad 204 may be associated with one or more of the approximately 25 root categories of word shapes used to compose complete Chinese characters. As in the example of entering text comprising Roman characters, multiple word shapes may be associated with a single key, and therefore multiple taps of a single key may be required in order to access a desired word shape. In accordance with embodiments of the present invention, keys within the keypad 204 may be associated with both letters for forming words and word shapes for composing Chinese characters.

The list of candidate words or characters created as a result of the selection of letters or word shapes is displayed, at least in part, by the visual display 216. For example, those words or characters that are more frequently occurring or otherwise deemed likely to be the desired word or character, may be displayed higher up in the list, while words or characters deemed less likely to be the desired word or character may be displayed lower down in the list. If the list is long enough that it cannot all be conveniently presented in the display 216, the cursor button 208 may be used to scroll through the complete list. The cursor button 208 may also be used in connection with the selection of a desired word or character, for example by highlighting the desired word or character in a displayed list using the cursor button 208, and then selecting that word or character by pressing the enter button 212.

Figure 3:
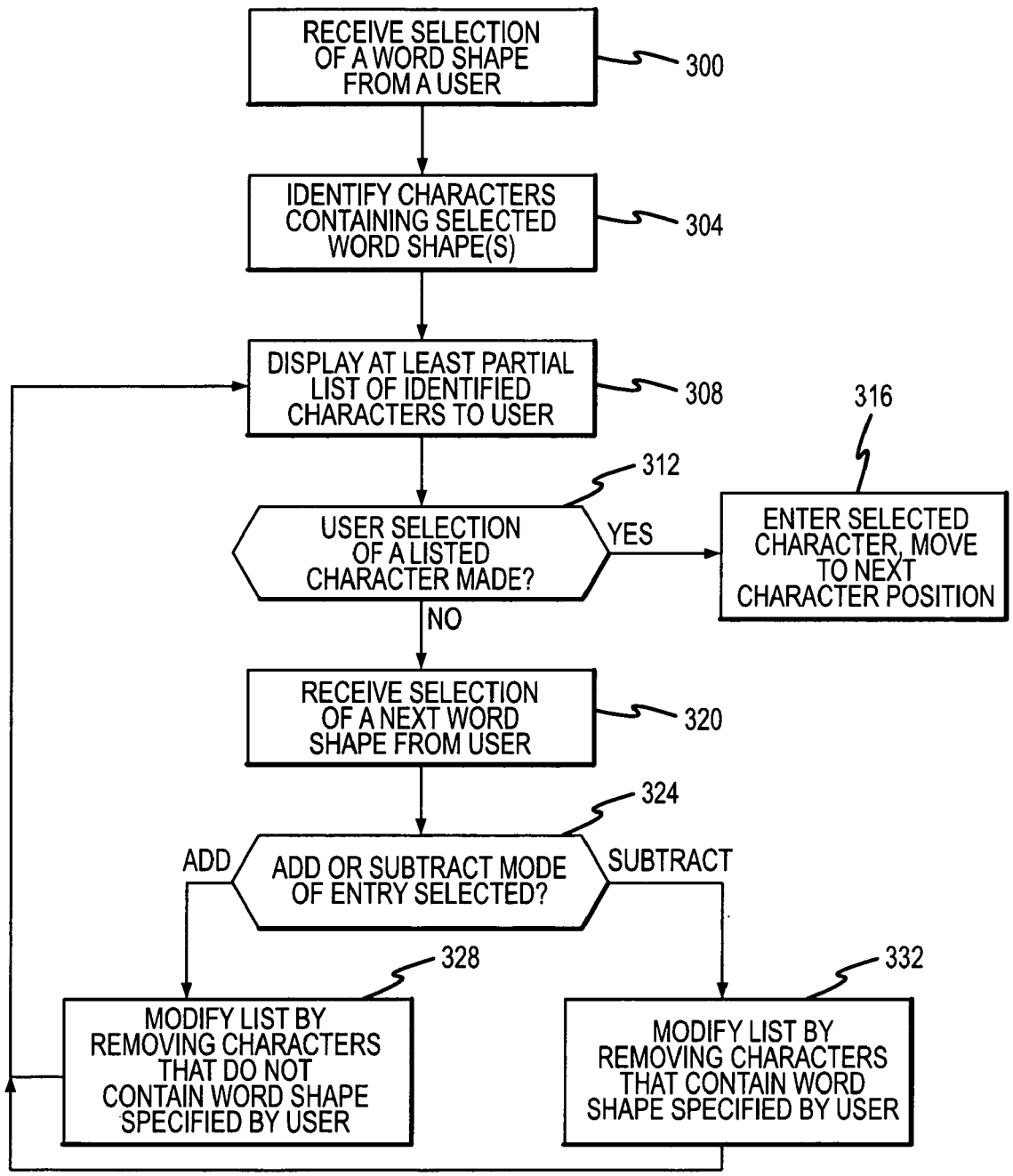
FIG. 3 is a flowchart depicting aspects of the operation of an autocompletion process in accordance with embodiments of the present invention.

With reference now to FIG. 3, aspects of the operation of a communications or computing device 100 providing automatic completion of words or characters in accordance with embodiments of the present invention are illustrated. Initially, at step 300, a selection of a letter or word shape is received from a user. In connection with a device 100 such as a cellular telephone 200, receiving a selection of a word shape can comprise a user keying in a selected letter or word shape using the keys of the keypad 204. In addition, the letter or word shape input by a user may be received while the device 100 is in a text entry mode. Furthermore, where the device 100 has relatively limited user input 112 facilities, different text modes may be selected by the user. For example, a device 100 that permits a user to enter letters comprising Roman characters and shapes comprising Chinese word shapes may select either a letter mode or a Chinese text mode, for example through a menu selection made in connection with the display 216 and the user inputs 112.

Following receipt of the user selection of a letter or word shape, words or characters containing the selected letters or word shapes are identified (step 304). In accordance with embodiments of the present invention, the identification of a word containing a selected letter (for example in an English text mode), or a character containing a selected word shape (for example while in a Chinese text mode) comprising performing a lookup in a table of candidate words (in an English text mode) or candidate characters (in a Chinese text mode) 132. More particularly, a character selection application 128 may receive the selection of a letter or character from the user via the user input 112, and may provide the selected letter or character to the table 132. In accordance with embodiments of the present invention, the table 132 comprises a hash table that allows words or characters containing a selected letter or word shape.

At least a partial list of identified words or characters are then displayed to the user (step 308). For example, a list of words or characters comprising those identified in step 304 are displayed in the visual display 216 as a hierarchical list, with those words or characters deemed more likely to be the word or character that the user is looking for placed higher up in the list than those words or characters that are deemed less likely to be the word or character that the user is looking for. At any one time, for example due to the limitations of a visual display 216, the list displayed may be only a partial list. Accordingly, if the user does not see a desired character in the portion of the list initially displayed, the user may scroll down to review other portions of the list. However, it should be appreciated that scrolling through the list is not required, even if the user does not identify a desired word or character within the portion of the list initially displayed. In particular, the user may wish to narrow the list as described herein, without searching a particular list for the desired word or character. Accordingly, at step 312, a determination is made is as to whether the user has selected a listed word or character. If the user has selected a listed word or character, for example by highlighting that character by controlling a cursor using the cursor button 208 and selecting the highlighted word or character by pressing the enter key 212, the selected word or character is entered, and the device 100 readies itself to receive the next word or character (step 316). Accordingly, it can be appreciated that a user can select a complete word or character by making a selection from the displayed list. Therefore, a user can enter complete words or characters, even though every component part of the selected word or character has not been individually entered by the user.

If the user does not make a selection of a listed word or character (and is not otherwise exited a text entry mode), it is likely because the user wishes to narrow the list of candidate words or characters. Accordingly, the device 100 may wait to receive further input. At step 320, a selection of a next letter or word shape is received from the user. This next selection may be entered in the same way that the initial letter or word shape was entered by the user. At step 324, a determination is made as to whether the device 100 has been placed in an additive or subtractive mode of entry. That is, embodiments of the present invention permit the user to specify whether a selected letter or word shape is required to be in each word or character in the candidate list, or whether the selected letter or word shape is prohibited from being any word or character included in the candidate list. If the user has specified an additive mode, the list of identified or candidate words or characters is modified by removing those words or characters that do not contain the letter or word shape specified by the user. That is, a letter or word shape specified while in the additive mode is a require letter or word shape. If the subtractive mode has been specified, the list is modified by removing those words or characters that contain the letter or word shapes specified by the user (step 332). That is, while in the subtractive mode, a letter or word shape specified by the user is prohibited from appearing in the words or characters included in the candidate list. Accordingly, it can be appreciated that the modifications performed at steps 328 or 332 typically reduce the number of words or characters included in the candidate list. The process may then return to step 308, where the now modified list is displayed, at least in part, to the user.

Figure 4A:
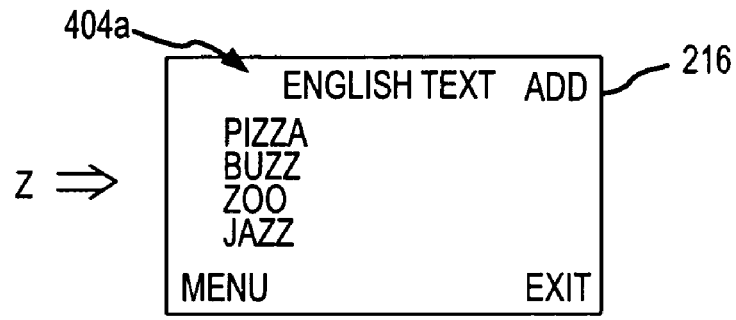
FIGS. 4A-4D depict example display outputs in accordance with embodiments to the present invention.
Figure 4B:
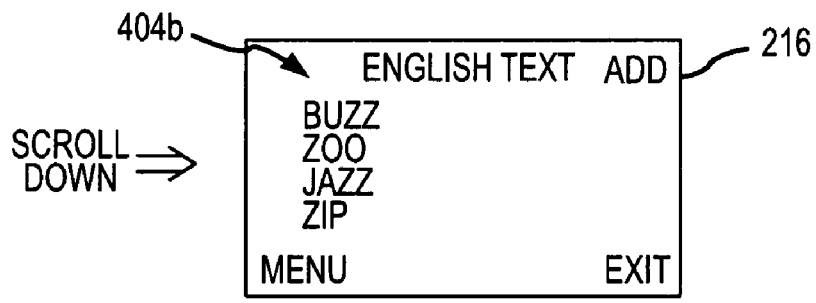
Figure 4C:
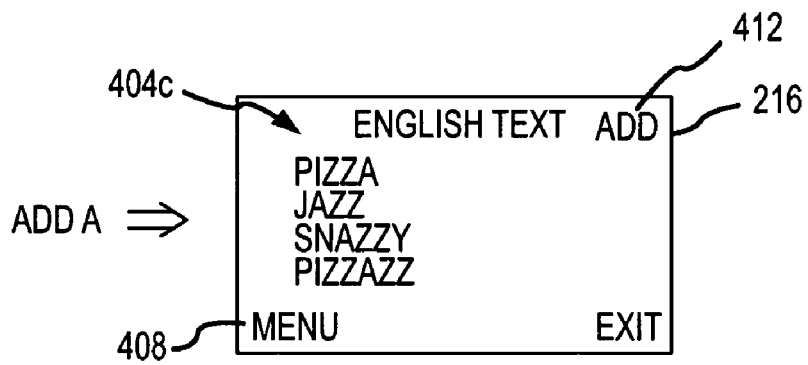

With reference now to FIGS. 4A-D, example output of a visual display 216 of a device 100 in accordance with embodiments of the present invention are illustrated. In this example, the user is in a text entry mode for use in connection with the entry of English language words. As shown in FIG. 4A, in response to the selection of the letter Z, embodiments of the present invention present the user with a list of words that contain the letter Z. The list may be ordered according to the relative frequency with which the included words are used. In accordance with further embodiments of the present invention, the relative frequency may be for use of words generally, or for use of words in specific context, such as words more often used in connection with text messaging or email applications. If the user sees the desired word in the displayed list, that word can be selected for inclusion in a message, label or other target application or facility that can receive the selected word from the character selection application 128 running on the device 100. If the user does not see the desired word in the list, the user may scroll down through the list to view other entries. With reference now to FIG. 4B, the output of the display 216 is shown after the user has scrolled down through the list 404 by one position, such that the word "zero" displayed initially (see FIG. 4A) is no longer displayed, and the new word "zip" is now displayed (see FIG. 4B). If the additional word now displayed ("zip") is the desired word, the user may select it and go on to enter a letter included in the next word the user desires, or the user may exit the text entry mode. With reference now to FIG. 4C, an example list 404c of candidate words is displayed after the user has specified a second letter that is required to be included in candidate words. Specifically, the user has selected a second character while the device 100 is in an additive mode. Whether the device 100 is in an additive or subtractive mode may be selected by accessing a menu 408, or by toggling a key included in the keypad 204. The currently selected mode may also be indicated by descriptive or suggestive text 412 displayed to the user. For purposes of the present example, it will be assumed that the user has selected the letter A as the second character that must be included in the list of candidate words. An example of a partial list of candidate words 404c that may be displayed after the selections of the letters Z and A is shown in FIG. 4C. As can be seen from this list, the order in which the user entered the selected characters (Z and then A) does not affect the candidate words included in the list 404c. That is, the candidate list 404c is generated without regard to the ordering of the selected letters.

Figure 4D:
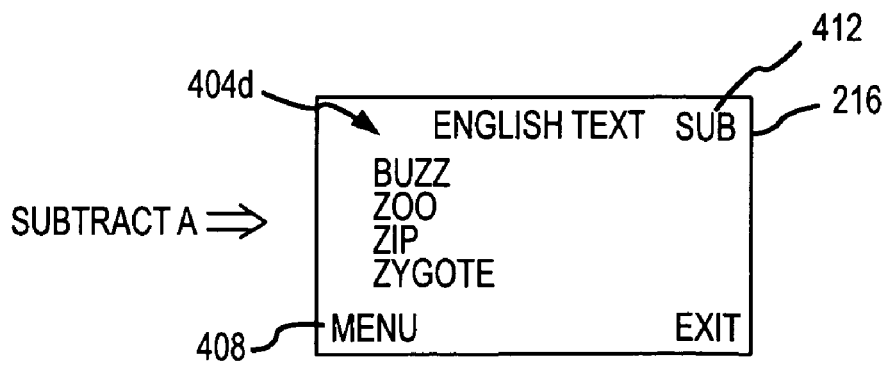

With reference now to FIG. 4D, an example of the screen that may be presented by a display 216 after the user has selected the letter A while in a subtractive mode is illustrated. As can be seen by comparing FIG. 4A to FIG. 4D, the list of candidate characters 404d is characterized by the absence of candidate words containing the letter A. That is, by specifying the letter Z in an additive mode, and then specifying the letter A in a subtractive mode (as shown in the mode indicator area 412), the user causes a candidate list, at least a portion of which is displayed, of words containing the letter Z but that do not contain the letter A. As noted above, a user may select between additive and subtractive modes through the menu 408, or through toggling a key included as part of a keypad 204.

Accordingly, it can be appreciated that embodiments of the present invention allow a user to generate and browse lists of candidate words that contain one or more specified characters. In addition or alternatively, the user can specify one or more letters that are prohibited from being included in candidate words. Additionally, it can be appreciated that the list of candidate words that is generated by the character selection application 128 is generated based on the inclusions and/or exclusions specified by the user, but without regard to the order in which letters for inclusion or exclusion were specified. As a result, through specifying particular letters for inclusion or exclusion, a user can generate narrowly tailored lists of candidate words, from which a user may be able to select a complete, desired word. Furthermore, it can be appreciated that, where the user is able to generate a list from which the desired word can be quickly and easily selected, substantial time may be saved, for example as compared to a situation in which the user is required to tap in each individual letter, in the correct order, using a potentially limited keypad 204. In addition, it can be appreciated that embodiments of the present invention can be of great assistance to a user who may not remember the correct spelling of a word, but may remember a number of the letters that are included in that word. That is, because the list of candidate words are generated without regard to the ordering of the characters specified for inclusion (or exclusion), a user may be successful in generating a list of words, from which the desired word can be recognized.

With reference now to FIGS. 5A-5D, examples of the operation and display 216 output of embodiments of the present invention while in a Chinese text mode are provided. For instance, FIG. 5A displays a list of candidate characters 504a such as may be displayed after the user has selected the illustrated word shape 506. In particular, the selected word shape 506 corresponds to word shapes that correspond to the object or idea of a tree. Furthermore, it should be noted that the character for or corresponding to the word "rest" 507a is included as a candidate character 504, even though the shape for tree was entered by the user as the first character, and even though the shape for "people" 506c (the other shape comprising the character "rest" 507a) would traditionally be written first.

Figure 5A:
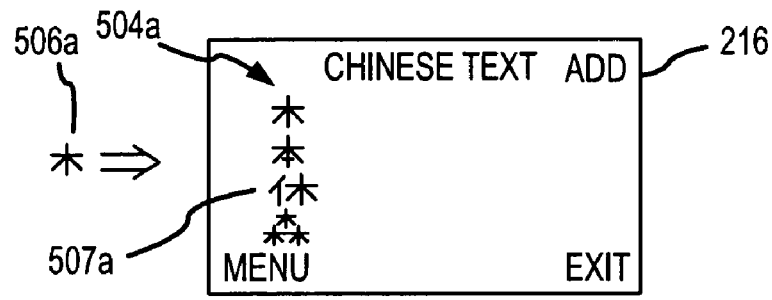
FIGS. 5A-5D depict example display outputs in accordance with other embodiments of the present invention.
Figure 5B:
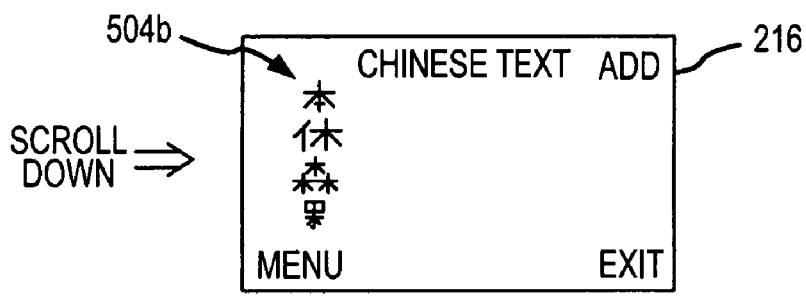

With reference now to FIG. 5B, has scrolled down to display a second portion of the candidate list 504b. Accordingly, it can be appreciated that embodiments of the present invention generate a list of candidate characters that contain a word shape specified by the user. Furthermore, the candidate list does not depend on the order in which the user has entered specified word shapes. For example, after specifying a first required word shape, the list of candidate characters may include characters that are not properly written by first writing the selected word shape. In this way, the user can be presented with complete characters that the user knows contains a particular word shape, even though the user may not know whether or not that word shape should be entered first when writing the complete character.

Figure 5C:
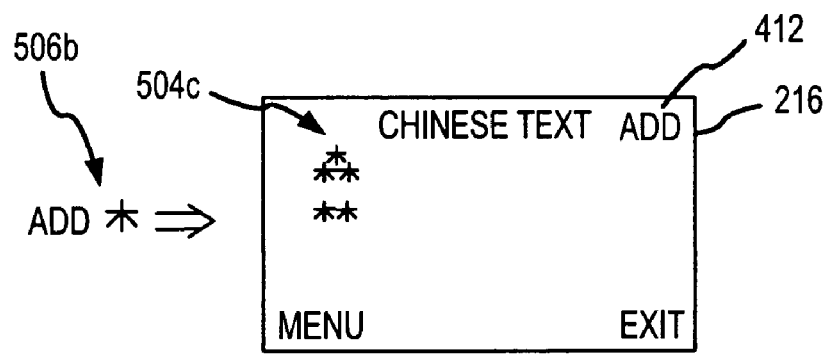

With reference now to FIG. 5C, an example of an output screen of a display 216 in response to the selection of an additional word shape is required to be included in each candidate character is illustrated. In this example, the user has made a selection of a second character 506b that is identical to the first specified character 506 (see FIG. 5A). Accordingly, each candidate character must include at least two instances of the specified word shape. This is illustrated in the example list of candidate characters 504c.

Figure 5D:
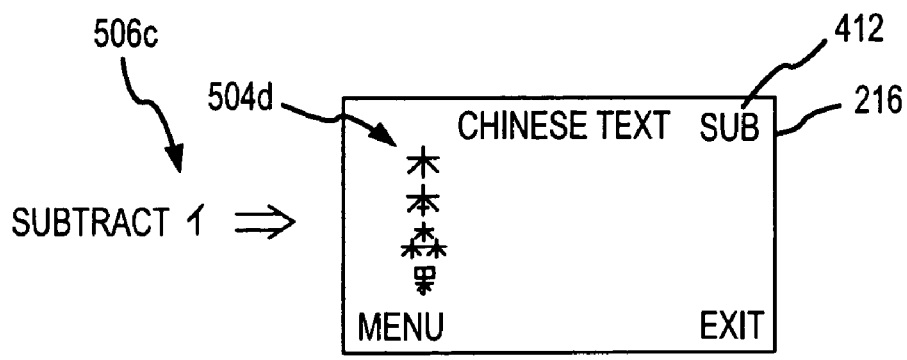

With reference now to FIG. 5D, an example output of a display 216 is shown in which, after selection of the word shape for a tree 506a (see FIG. 5A), the word shape 506c corresponding to "people" is subtracted, resulting in a candidate list 504d, that compared to the candidate list 504a, does not include the character for "rest" 507a (see FIG. 5A).

Accordingly, it can be appreciated by one of skill in the art from the description provided herein that embodiments of the present invention can be of particular assistance in connection with the entry of complex composite characters using a communication or computer device 100. In particular, a user who is able to identify one or more word shapes that are (or are not) included in a desired character can generate a list of candidate characters that will likely include the desired character. Furthermore, this can be done even if the user does not know which word shape included in the character should be written first. Furthermore, in order to narrow a list of candidate characters, a user is allowed to either specify additional word shapes that are required to be included in the character (while in an additive mode) or specify one or more word shapes that are prohibited from being included in a candidate character (while in a subtractive mode).

Although certain of the examples provided herein have discussed the use of input keys 204, 208 and 212 provided as part of a device 100 user input 112, it should be appreciated that embodiments of the present invention are not so limited. For example, a display 216 comprising a touch screen display can be used to make letter or character selections. In addition, embodiments of the present invention may operate in cooperation with a touch screen display 216 that permits a user to enter a desired letter or word shape (or a short hand symbol for a desired letter or word shape) by writing on the display 216 or on a touch sensitive area provided as part of the device 100, using a stylus.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for specifying a written character, comprising:
    receiving a selection of a first character shape;
    identifying a first plurality of characters containing said first character shape;
    displaying at least one of said first plurality of characters;
    receiving a selection of a subtraction mode;
    receiving a selection of a second character shape; and
    in response to said selection of a second character shape, modifying said first plurality of characters to obtain a second plurality of characters, wherein said second plurality of characters includes only characters containing said first selected shape but not said second selected shape; and
    displaying at least one of said second plurality of identified characters.

2. The method of claim 1, wherein said identifying a first plurality of characters comprises ordering said first plurality of characters, and wherein said displaying at least one of said first plurality of identified characters includes displaying a number of said first plurality of identified characters according to said ordering.

3. The method of claim 2, wherein said ordering said first plurality of characters comprises ordering said first plurality of characters according to a relative frequency of use of said characters included in said first plurality of characters.

4. The method of claim 1, wherein said selection of a first character shape is received as an input to a mobile telephone, and wherein said steps of displaying are performed using a display of said mobile telephone.

5. The method of claim 4, wherein at least some character shapes available for selection are selected using an input key of said mobile telephone.

6. The method of claim 1, wherein said identifying a first plurality of characters containing said first character shape comprises selecting a plurality of characters from a word shapes database associating characters with shapes used to create said characters.

7. The method of claim 6, wherein said word shapes database comprises a word shapes hash table.

8. The method of claim 1, wherein each of said first plurality of characters comprises an ideogram.

9. The method of claim 1, wherein said method is implemented by a computational component comprising a computer readable storage medium containing instructions for performing the method.

10. The method of claim 1, wherein said method is implemented by a computational component comprising a logic circuit.

11. A device for facilitating selection of textual characters, comprising:
    a user input, wherein a number of letters or character shapes are available for selection by a user;
    a memory, wherein said memory contains a table of characters; and
    a processor, wherein, in response to a selection of at least first and second character shapes, said processor executes instructions to perform a look up in said table in said memory to select a first set of characters, and wherein, in response to a selection of a subtraction mode by a user after the selection of the first character shape and prior to the selection of the second character shape, each character included in said first set of characters contains said first character shape and not said second character shape.

12. The device of claim 11, further comprising:
    a user display, wherein said first set of characters includes a plurality of characters, and wherein at least some of said characters in said first set of characters are displayed on said user display.

13. The device of claim 11, further comprising:
    a communication interface, wherein a selected character may be transmitted to a recipient device.

14. The device of claim 11, wherein said user input comprises a mobile device keypad.

15. The device of claim 14, wherein said mobile device comprises a mobile telephone.

16. A device for providing character selection features, comprising:
    means for storing associations of a plurality of characters with one or more character shapes;
    means for receiving a selection of a first character shape and a second character shape;
    means for retrieving from said means for storing associations at least a first set of characters containing said first character shape;
    means for receiving a selection of a subtraction mode;
    means for editing said first set of characters to form a second set of characters, wherein said second set of characters includes only those characters containing said first character shape and not said second character shape; and
    means for displaying at least one of said characters included in said first set of characters and for displaying at least one of said characters included in said second set of characters.

17. The device of claim 16, further comprising:
    means for selecting one of an addition mode and a subtraction mode, wherein said selection of said second character shape while said subtraction mode is selected results in said second set of characters including only those characters containing said first character set and not said second character set.

* * * * *